(12) United States Patent
Ishiyama

(10) Patent No.: US 7,597,973 B2
(45) Date of Patent: Oct. 6, 2009

(54) MAGNETIC DISK AND METHOD OF PRODUCING THE SAME

(75) Inventor: Masafumi Ishiyama, Singapore (SG)

(73) Assignees: Hoya Corporation, Tokyo (JP); Hoya Magnetics Singapore Pte. Ltd., Singapore (SG)

( * ) Notice: Subject to any disclaimer, the term of this patent is extended or adjusted under 35 U.S.C. 154(b) by 0 days.

(21) Appl. No.: 11/563,411

(22) Filed: Nov. 27, 2006

(65) Prior Publication Data

US 2007/0087228 A1    Apr. 19, 2007

Related U.S. Application Data

(62) Division of application No. 10/854,256, filed on May 27, 2004, now Pat. No. 7,166,319.

(30) Foreign Application Priority Data

May 28, 2003    (JP)    ............................. 2003-150860

(51) Int. Cl.
    *G11B 5/66* (2006.01)
(52) U.S. Cl. .................................. 428/833.3
(58) Field of Classification Search ............. 428/835.2, 428/833.5, 833.6
    See application file for complete search history.

(56) References Cited

U.S. PATENT DOCUMENTS 5,637,393 A * 6/1997 Ueda et al. .................. 428/332
6,096,694 A * 8/2000 Tei et al. ...................... 508/562
6,544,893 B2   4/2003 Eto
6,730,403 B1 * 5/2004 Shirai et al. .............. 428/833.5

FOREIGN PATENT DOCUMENTS

| JP | 1-184723 A | 7/1989 |
| JP | 7-192255 A | 7/1995 |
| JP | 7-249224 A | 9/1995 |
| JP | 8-273154 A | 10/1996 |
| JP | 2000-067428 A | 3/2000 |
| JP | 2000235708 A | 8/2000 |
| JP | 2001-266328 A | 9/2001 |
| JP | 2002-032907 A | 1/2002 |

OTHER PUBLICATIONS

Machine translation of JP 07-249224, Sep. 1995.*

* cited by examiner

Primary Examiner—Holly Rickman
(74) Attorney, Agent, or Firm—Sughrue Mion, PLLC

(57) ABSTRACT

A magnetic disk includes a substrate on which a nonmagnetic metal layer, a magnetic layer, a carbon-based protection layer, an alcohol-based coupling layer, and a lubrication layer successively formed thereon. The lubrication layer contains a hydroxyl- or a carboxyl-modified compound as a lubricating material. The alcohol-based coupling layer contains, for example, lower alcohol as a main component and is deposited on the carbon-based protection layer, for example, by vapor deposition. The alcohol-based coupling layer may be replaced by a layer containing lower alcohol. The carbon-based protection layer may be deposited by plasma CVD.

5 Claims, 1 Drawing Sheet

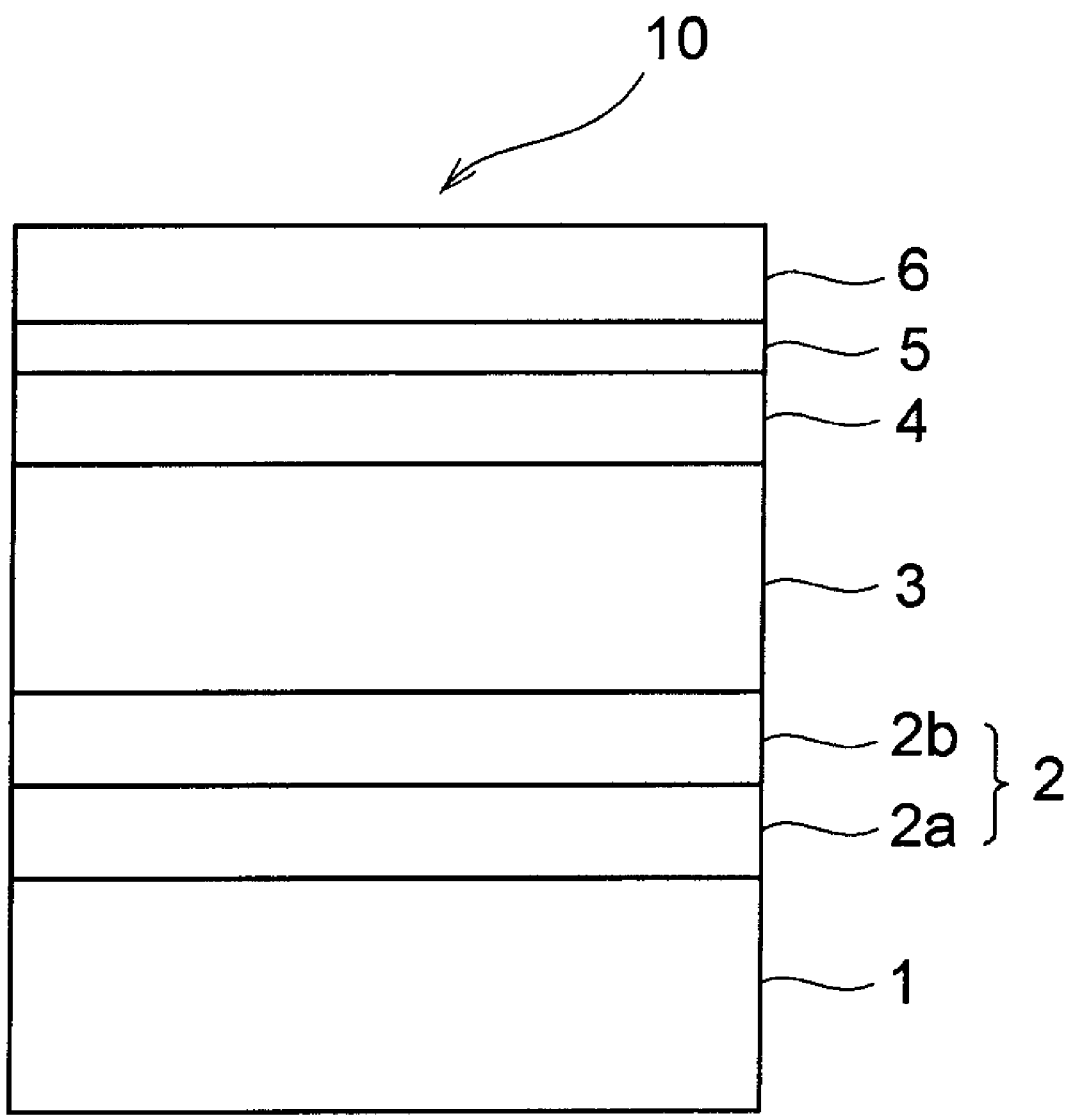

MAGNETIC DISK AND METHOD OF PRODUCING THE SAME

This is a divisional of application Ser. No. 10/854,256 filed May 27, 2004 now U.S. Pat. No. 7,166,319. The entire disclosure(s) of the prior application(s), application Ser. No. 10/854,256 is hereby incorporated by reference.

This application claims priority to Japanese patent application No. 2003-150860, the disclosure of which is incorporated herein by reference.

BACKGROUND OF THE INVENTION

This invention relates to a magnetic disk to be loaded in a magnetic disk apparatus, such as a HDD (hard disk drive), for recording information and a method of producing the same.

At present, following the development of the IT (information technology) industry, it is requested to achieve dramatic technical innovation in the information recording technology, in particular, the magnetic recording technology. For example, in the field of a magnetic disk to be loaded in a magnetic disk apparatus, such as a HDD, there is a demand for a technique capable of achieving an information recording density on the order of 40 Gbit/inch$^2$ to 100 Gbit/inch$^2$ or more.

In the magnetic disk apparatus, use has been made of a CSS (Contact Start and Stop) system. In the CSS system, a magnetic head is kept in contact with a contact sliding zone formed on a surface of a magnetic disk when the magnetic disk apparatus is turned off or stopped. In a starting operation, the magnetic head slides on the contact sliding zone in contact therewith to be slightly lifted up. Then, a read or a write operation is started in a read/write zone located outside or inside the contact sliding zone. In the CSS system, the contact sliding zone separate from the read/write zone must be provided on the magnetic disk.

Furthermore, in the CSS system, the surface of the magnetic disk is coated with a protection layer in order to protect the magnetic disk from the magnetic head which slides in contact with the magnetic disk. For example, Japanese Patent Application Publication (JP-A) No. H8-273154 discloses a method of producing a magnetic recording medium, comprising forming a protection layer by sputtering, cleaning each layer formed on a substrate with a cleaning liquid, and drying a surface on which the protection layer is to be formed, thereby improving CSS durability and the like.

In response to a recent demand for an increase in recording density, various approaches have been made in order to achieve an information recording density as high as 100 Gbit/inch$^2$ or more. As one of the approaches, it is required to narrow a gap (magnetic spacing) between a magnetic layer of the magnetic disk and a read/write element of the magnetic head to 20 nm or less so that a spacing loss is decreased and an S/N ratio is improved.

In order to achieve the magnetic spacing of 20 nm or less, the protection layer of the magnetic disk is required to have a thickness as small as 6 nm or less. The magnetic head must have a very low flying height of 12 nm or less. Further, in a recent magnetic disk apparatus, a LUL (Load Unload) system is introduced instead of the CSS system which has been used so far. In the LUL system, the magnetic head is retreated on an inclined support, called a ramp, located outside the magnetic disk when the magnetic disk apparatus is turned off or stopped. In a starting operation, the magnetic head slides from the ramp to an area above the magnetic disk after the rotation of the magnetic disk is started. Then, the magnetic head travels over the magnetic disk in a flying state to carry out a read or a write operation. In a stopping operation, the magnetic head is retreated to the ramp outside the magnetic disk and, thereafter, the rotation of the magnetic disk is stopped. A series of the above-mentioned operations is called a LUL operation.

The LUL system does not require the CSS zone (contact sliding zone for the magnetic head) to be formed on the magnetic disk so that a wide read/write zone is secured on the surface of the magnetic disk as compared with the magnetic disk of the CSS system. Therefore, this system advantageously contributes to a higher recording capacity.

In the LUL system, the magnetic head is not brought into contact with the surface of the magnetic disk, unlike the CSS system. Therefore, it is unnecessary to provide the surface of the magnetic disk with a convex/concave pattern for preventing sucking and sticking of the magnetic head so that the surface of the magnetic disk can be extremely flattened and smoothed. Accordingly, with the magnetic disk of the LUL system, the flying height of the magnetic head can be remarkably lowered as compared with the CSS system. It is therefore possible to achieve a high S/N ratio of a recording signal and to contribute to a higher recording capacity of the magnetic disk apparatus.

Following recent introduction of the LUL system, the flying height of the magnetic head is remarkably lowered. Accordingly, the magnetic disk is required to stably operate even at a very low flying height of 10 nm or less. However, if the magnetic head travels in a flying state over the surface of the magnetic disk at such a very low flying height, there arises a problem of frequent occurrence of a fly stiction defect or a head corrosion defect.

The fly stiction defect is a defect in which the magnetic head is fluctuated in flying position or flying height during traveling in a flying state, often followed by irregular variation in read output. Sometimes, the magnetic head is contacted with the magnetic disk during traveling in a flying state to cause a head crash defect and break the magnetic disk. The head corrosion defect is a defect in which an element portion of the magnetic head is corroded to cause a trouble in the write or the read operation. Sometimes, the write or the read operation is impossible or the corroded element is expanded to damage the surface of the magnetic disk during traveling in a flying state. Occurrence of those defects will significantly deteriorate HDI (Head Disk Interface) reliability of the magnetic head during traveling in a flying state, for example, LUL durability. Further, during traveling in a flying state, the magnetic head may fall onto the surface of the magnetic disk to be sucked and stuck thereto.

SUMMARY OF THE INVENTION

It is therefore an object of this invention to provide a magnetic disk which is capable of preventing occurrence of a fly stiction defect and has excellent LUL durability suitable for a LUL system and to provide a method of producing the same.

It is another object of this invention to provide a magnetic head which is capable of preventing occurrence of a fly stiction defect and is suitable for a lower flying height of a magnetic head and to provide a method of producing the same.

The present inventor thoroughly and diligently studied on the above-mentioned objects. As a result, it has been revealed that easy occurrence of the fly stiction defect in the LUL system is caused by contamination deposited on a surface of a magnetic head. It has been found out that the deposition of contamination on the surface of the magnetic head is more remarkably promoted in the LUL system as compared with the CSS system used so far. Specifically, in the CSS system, the contamination migrating to and deposited on the surface of the magnetic head is removed and the magnetic head is cleaned when the magnetic head slides on the contact sliding zone on the surface of the magnetic disk in contact therewith. On the other hand, in the LUL system, such cleaning function is not obtained because the magnetic head does not slides on the magnetic disk in contact therewith. As a consequence, the contamination is continuously deposited on the surface of the magnetic head.

The contamination migrating to and deposited on the surface of the magnetic head as mentioned above brings about a corrosion defect of a read/write element of the magnetic head. Upon occurrence of corrosion of a read element portion of the head, an output power of a read signal is decreased to cause frequent occurrence of a read error. Sometimes, a reading operation is impossible. Further, a flying position of the magnetic head is disturbed by deposition of contamination. This may brings about occurrence of a fly stiction defect in which the magnetic head suddenly falls onto the magnetic disk during operation of a magnetic disk apparatus. Those defects more remarkably occur in the LUL system.

In the CSS system used so far, even if the contamination migrates onto the magnetic head, no serious fly stiction defect is caused because of the above-mentioned cleaning function. Therefore, such problem is not recognized. However, following the introduction of the LUL system, the fly stiction defect is caused to occur. It is found out that the fly stiction defect is caused by deposition of contamination on the surface of the magnetic head. Thus, the fly stiction defect emerges as a new problem to be solved.

The present inventor further studied about migration of contamination onto the magnetic head. As a result, it has been found out that, because of a lower flying height of the magnetic head, a lubrication layer formed on the surface of the magnetic disk so as to suppress an interference from the magnetic head flying and traveling over the magnetic disk tends to migrate from the surface of the magnetic disk towards the magnetic head to be deposited as contamination on the surface of the magnetic head. Consideration was also made about the relationship between the migration of contamination and each of the type of a lubricant forming the lubrication layer, the thickness of the lubrication layer, and the adherence of the lubrication layer. As a result, it has been found out that the migration of contamination onto the magnetic head mainly results from the adherence of the lubrication layer.

Generally, the lubrication layer of the magnetic disk is formed by preparing a solution obtained by dispersing and dissolving a fluorine-containing alkyl polyether lubricant in a solvent, such as hydro fluoro carbon, dipping the magnetic disk into the solution after a carbon-based protection layer is deposited on the magnetic disk to coat the protection layer with the solution, and drying the solution. If the adherence of the lubrication layer is poor with respect to the carbon-based protection layer, a lubricating material forming the lubrication layer may possibly migrate onto the surface of the magnetic head. However, in the CSS system used so far, no serious fly stiction defect is caused to occur even if contamination derived from the lubrication layer migrates onto the magnetic head. Therefore, the adherence of the lubrication layer is not recognized as a problem. However, at a lower flying height of the magnetic head, particularly, at a flying height of 10 nm or less, the lubricating material tends to migrate from the surface of the magnetic disk towards the magnetic head to cause a corrosion defect or a fly stiction defect of the magnetic head if the adherence of the lubrication layer is poor. As described above, in the LUL system, a cleaning function achieved in the CSS system, i.e., a cleaning function for the contamination migrating and deposited on the surface of the magnetic head is not obtained so that occurrence of the above-mentioned defects may be accelerated.

As a result of further research by the present inventor, it has been found out that, if an alcohol-based coupling layer is interposed between the carbon-based protection layer and the lubrication layer at least during deposition of layers on a magnetic disk substrate, the adherence of the lubrication layer is improved so as to advantageously prevent the lubrication layer from migrating from the surface of the magnetic disk towards the magnetic head even if the flying height of the magnetic head is as low as 10 nm or less. Therefore, it is possible to prevent the corrosion defect and the fly stiction defect of the magnetic head as a result of migration of the lubrication layer. Thus, the above-mentioned structure including the alcohol-based coupling layer is particularly suitable for the LUL system.

Based on the above-mentioned findings, the present inventor completed the invention having the following structures in order to avoid the fly stiction defect or the like, which tends to be remarkable at a lower flying height of the magnetic head and in the LUL system.

As will readily be understood, this invention is advantageously applicable to a magnetic disk for the CSS system also.

Structure 1

A magnetic disk comprising a disk substrate on which a magnetic layer, a carbon-based protection layer, an alcohol-based coupling layer, and a lubrication layer containing a hydroxyl- or a carboxyl-modified compound are successively deposited.

Structure 2

A magnetic disk comprising a disk substrate on which a magnetic layer, a carbon-based protection layer, and a layer containing a mixture of alcohol and a hydroxyl- or a carboxyl-modified compound are successively deposited.

Structure 3

A magnetic disk according to structure 1 or 2, wherein the hydroxyl-modified compound is a perfluoropolyether compound having a hydroxyl group at its terminal end.

Structure 4

A magnetic disk according to any one of structures 1 or 2, wherein the alcohol-based coupling layer or the alcohol contains lower alcohol as a main component.

Structure 5

A magnetic disk according to structures 1 or 2, wherein the carbon-based protection layer contains hydrogen or nitrogen.

Structure 6

A magnetic disk according to structures 1 or 2, wherein the magnetic disk is adapted to be loaded in a magnetic disk apparatus of a load unload system.

Structure 7

A method of producing a magnetic disk, comprising successively depositing a magnetic layer and a carbon-based protection layer on a disk substrate, thereafter depositing an alcohol-based coupling layer on the carbon-based protection layer, and then depositing a lubrication layer containing a hydroxyl- or a carboxyl-modified compound.

Structure 8

A method of producing a magnetic disk according to structure 7, wherein a surface on which the alcohol-based coupling layer is to be deposited is contacted with alcohol after successively depositing the magnetic layer and the carbon-based protection layer on the disk substrate and before depositing the alcohol-based coupling layer.

Structure 9

A method of producing a magnetic disk according to structure 7, wherein the alcohol-based coupling layer is deposited so that, after deposition, a film surface of the alcohol-based coupling layer has a water contact angle of 50 degrees or less.

Structure 10

A method of producing a magnetic disk according to any one of structure 7, wherein the disk is heated after deposition of the lubrication layer containing the hydroxyl- or the carboxyl-modified compound.

Structure 11

A magnetic disk comprising a disk substrate on which a magnetic layer, a carbon-based protection layer, a layer containing lower alcohol, and a lubrication layer containing a hydroxyl- or a carboxyl-modified compound are successively deposited.

Structure 12

A method of producing a magnetic disk, comprising successively depositing a magnetic layer and a carbon-based protection layer on a disk substrate, thereafter depositing a layer containing lower alcohol on the carbon-based protection layer, and then depositing a lubrication layer containing a hydroxyl- or a carboxyl-modified compound.

As described in structure 1, a magnetic disk according to this invention comprises a disk substrate on which a magnetic layer, a carbon-based protection layer, an alcohol-based coupling layer, and a lubrication layer containing a hydroxyl- or a carboxyl-modified compound are successively deposited.

Thus, the alcohol-based coupling layer is deposited between the carbon-based protection layer and the lubrication layer containing the hydroxyl- or the carboxyl-modified compound. Herein, the hydroxyl- or the carboxyl-modified compound is, for example, an alcohol-modified perfluoropolyether compound which is generally used as a lubricating material for a surface of the magnetic disk. By interposing the alcohol-based coupling layer containing alcohol as a main component between a layer containing the lubricating material, i.e., the lubrication layer and the carbon-based protection layer, the adherence of the lubrication layer can be improved so as to advantageously prevent migration of the lubrication layer from the surface of the magnetic disk towards a magnetic head even if the flying height of the magnetic head is as very low as 10 nm or less. As a consequence, it is possible to prevent a corrosion defect or a fly stiction defect of the magnetic head as a result of migration of the lubrication layer.

According to the study by the present inventor, the reason why the adherence of the lubrication layer is improved by interposition of the alcohol-based coupling layer between the lubrication layer and the carbon-based protection layer is supposed as follows.

Generally, the lubrication layer is deposited by directly applying a perfluoropolyether lubricant on the protection layer. It is supposed that the lubrication layer and the protection layer are bonded to each other only by intermolecular force so that bonding force is very weak and the adherence of the lubrication layer is insufficient. In this invention, alcohol contained in the alcohol-based coupling layer deposited on the protection layer has a hydroxyl group. Therefore, deposition of the alcohol-based coupling layer on the protection layer results in presence of a sufficient amount of hydroxyl groups on the surface of the protection layer. The compound contained in the lubrication layer deposited on the alcohol-based coupling layer has a hydroxyl group or a carboxyl group at its terminal end. Therefore, hydrogen bond is formed between the compound and the hydroxyl groups on the surface of the protection layer to produce coupling force by the hydrogen bond. Thus, the protection layer and the lubrication layer are bonded not only by the intermolecular force but also by the bonding force by the hydrogen bond. As a result, the adherence between the protection layer and the lubrication layer is improved.

The alcohol forming the alcohol-based coupling layer is a substance obtained by replacing a hydrogen atom in hydrocarbon by a hydroxyl group (—OH). In this invention, lower alcohol is advantageously used as a main component of the alcohol-based coupling layer. Herein, the lower alcohol is such alcohol that the number of carbon atoms per one molecule is 1 to 6. Use of the lower alcohol is preferable because, as the number of carbon atoms is increased, it is more difficult to vaporize the alcohol into a gas to be supplied to a deposition apparatus. Any lower alcohol, either straight-chain or branched, is suitably used. As the straight-chain lower alcohol, for example, methyl alcohol, ethyl alcohol, n-propyl alcohol, n-butyl alcohol, n-amyl(pentyl)alcohol, and n-hexyl alcohol may be used. As the branched lower alcohol, for example, isopropyl alcohol, isobutyl alcohol, tert-butyl alcohol, and isoamyl alcohol may be used. Further, use may be made of unsaturated alcohol, such as vinyl alcohol, or polyvalent alcohol, such as ethylene glycol and glycerin, having two or more hydroxyl groups per one molecule. Each of the above-mentioned alcohols may be used alone or a combination of two or more species of the above-mentioned alcohols may be used. Among others, isopropyl alcohol is preferably used in this invention. Isopropyl alcohol has a relatively low boiling point of 82° C. and is therefore suitable for film formation by vapor deposition which will later be described.

The thickness of the alcohol-based coupling layer is not specifically limited as far as the function of this invention is not impaired. Generally, however, the thickness is suitably within a range between about 0.5-2.0 angstroms. If the thickness of the alcohol-based coupling layer is excessively small, a sufficient amount of hydroxyl groups contributing to hydrogen bond with the lubricating material is not present on the surface of the protection layer. Therefore, the function of improving the adherence with the lubrication layer is difficult to achieve. On the other hand, if the thickness of the alcohol-based coupling layer is excessively large, the adherence of the alcohol-based coupling layer with respect to the protection layer is decreased. As a result, the adherence between the protection layer and the lubrication layer is insufficient.

The above-mentioned thickness is a thickness of the alcohol-based coupling layer upon deposition. When the alcohol-based coupling layer is deposited and, thereafter, the lubrication layer is deposited on the alcohol-based coupling layer, a diffusion region is formed with lapse of time at a boundary between the alcohol-based coupling layer and the lubrication layer. Then, the boundary between the alcohol-based coupling layer and the lubrication layer may possibly become unclear. Sometimes, the alcohol-based coupling layer is intermingled with the lubrication layer adjacent thereto with lapse of time so that the alcohol-based coupling layer is no longer independently present in appearance and is difficult to detect.

For example, the thickness of the alcohol-based coupling layer upon deposition may be calculated from a peak intensity of OH stretching vibration detected by a Fourier transform infrared spectrometer (FTIR). Further, the alcohol-based coupling layer in the magnetic disk produced in this invention may be detected by TOF-SIMS (Time Of Flight Secondary Ion Mass Spectrometry).

As a method of depositing the alcohol-based coupling layer in this invention, use may be made of spin-coating or dipping well known in the art. In this invention, vapor deposition is preferable. Preferably, the alcohol-based coupling layer in this invention contains lower alcohol as a main component. Although depending upon the number of carbon atoms, the lower alcohol has a relatively low boiling point and is easily vaporized into a molecular state. Deposition can be carried out in the molecular state. Therefore, according to the vapor deposition, the alcohol-based coupling layer having a very small thickness on the order of 0.5 to 2.0 angstroms mentioned above can be uniformly formed. Herein, the thickness depends upon a deposition time. Therefore, it is possible to easily control the thickness of the alcohol-based coupling layer by controlling the deposition time.

Before deposition of the alcohol-based coupling layer, a surface on which the alcohol-based coupling layer is to be deposited may be contacted with alcohol. For convenience of description, the "surface on which the alcohol-based coupling layer is to be deposited" may be referred to as the "coupling layer deposition surface" in the present specification. Specifically, after the magnetic layer and the carbon-based protection layer are successively deposited on the disk substrate and before the alcohol-based coupling layer is deposited, the coupling layer deposition surface is contacted with alcohol. Thereafter, the alcohol-based coupling layer is deposited. The alcohol-based coupling layer is deposited on the carbon-based protection layer. Therefore, the coupling layer deposition surface is a principal surface of the protection layer. Thus, by preliminarily bringing the coupling layer deposition surface into contact with alcohol before the alcohol-based coupling layer is deposited, the coupling layer deposition surface is improved in affinity with alcohol so that the function of improving the adherence of the lubrication layer by the alcohol-based coupling layer deposited on the coupling layer deposition surface is much enhanced. Further, by preliminarily bringing the coupling layer deposition surface into contact with alcohol, a function of cleaning the coupling layer deposition surface by removing foreign matters and organic substances adhered to the coupling layer deposition surface is obtained simultaneously. Therefore, the function of this invention is promoted. The alcohol with which the coupling layer deposition surface is contacted may be same as or different from the main component of the alcohol-based coupling layer. In view of the affinity, it is preferable to use lower alcohol same as that used in the alcohol-based coupling layer.

As a method of preliminarily bringing the coupling layer deposition surface into contact with alcohol, use may be made of a dipping method of dipping the disk into alcohol after the protection layer is formed on the disk substrate or a spinning method of supplying alcohol onto the surface of the protection layer while the disk is rotated. In this case, a liquid temperature of the alcohol is selected to be an appropriate temperature lower than the boiling point of the alcohol.

The coupling layer deposition surface may preliminarily be cleaned with water. Cleaning with water purifies the coupling layer deposition surface. As a cleaning method, dipping or spinning may be used. In this case, it is preferable to use, for example, hot pure water kept at 70° C. or more in view of a cleaning function.

Use may be made of a combination of the step of cleaning the coupling layer deposition surface with water and the step of bringing the coupling layer deposition surface into contact with alcohol. In this case, it is preferable to adopt a process in which the coupling layer deposition surface of the protection layer is cleaned with water and is thereafter brought into contact with alcohol. In this manner, it is possible to obtain an excellent purifying function of purifying the coupling layer deposition surface and to achieve an effect of enhancing the function of improving the adherence of the lubrication layer by the alcohol-based coupling layer. Thus, the functions of this invention are promoted.

In this invention, a film surface of the alcohol-based coupling layer after deposition preferably has a water contact angle of 50 degrees or less. When the alcohol-based coupling layer is deposited on the surface of the protection layer, the surface of the protection layer is covered with hydroxyl groups and is improved in affinity with water. It is supposed that, when the layer (lubrication layer) containing the hydroxyl- or the carboxyl-modified compound is deposited on the alcohol-based coupling layer, bonding force by hydrogen bond between the hydroxyl groups and the compound is produced so that the adherence of the lubrication layer containing the compound is improved. As a result of study by the present inventor, it has been found out that, if the film surface of the alcohol-based coupling layer after deposition has a water contact angle of 50 degrees or less, the function of improving the adherence of the lubrication layer by the alcohol-based coupling layer is enhanced. In particular, it is preferable that the contact angle is 35 degrees or less. On the other hand, if the contact angle is greater than 50 degrees, the function of improving the adherence of the lubrication layer is insufficient.

As the hydroxyl- or the carboxyl-modified compound contained in the lubrication layer deposited on the alcohol-based coupling layer in this invention, use is preferably made of an alcohol-modified perfluoropolyether compound with a hydroxyl group introduced at its terminal end or a carboxyl-modified perfluoropolyether compound with a carboxyl group (—COOH) introduced at its terminal end. Such perfluoropolyether compound with the hydroxyl group or the carboxyl group at its terminal end has a straight-chain structure and exhibits an appropriate lubricating function for a magnetic disk. Therefore, such compound is suitably used as a lubricating material. In addition, the compound contributes to hydrogen bond with the alcohol-based coupling layer in this invention to improve the adherence of the lubrication layer. In particular, a perfluoropolyether compound having a hydroxyl group or a carboxyl group at each of opposite terminal ends of a molecule, i.e., at each of opposite terminal ends of a perfluoropolyether main chain is advantageous because the functions of this invention are enhanced.

As the perfluoropolyether compound with a hydroxyl group introduced at its terminal end, which is preferably used in this invention, there are known, for example, Fomblin Z-Tetraol™ (trade name) manufactured by Solvay Solexis and Fomblin Z-dol™ manufactured by Solvay Solexis as commercially available products. As the perfluoropolyether compound with a carboxyl group introduced at its terminal end, there is known, for example, Fomblin Z-DIAC™ manufactured by Solvay Solexis as a commercially available product. Each of these compounds may be used alone or a combination of two or more species may be used in combination.

As a method of depositing the lubrication layer containing the hydroxyl- or the carboxyl-modified compound, use may be made of dipping or spin coating well known in the art.

The thickness of the lubrication layer upon deposition desirably falls within a range between 7 and 20 angstroms. If the thickness of the lubrication layer is smaller, a uniform layer is difficult to form and an excellent lubricating characteristic is difficult to obtain. On the other hand, if the thickness of the lubrication layer is excessively thick, the adherence is high in a region near the boundary with the alcohol-based coupling layer in this invention but is low on an exposed surface of the lubrication layer. As a result, migration to the magnetic head tends to occur.

The lubrication layer after deposited preferably has a coverage not smaller than 85%, more preferably, not smaller than 90%. If the coverage of the lubrication layer is small, the thickness of the lubrication layer is not uniform and the surface of the disk is not uniformly covered with the lubrication layer. As a result, an excellent lubricating characteristic is not obtained. In this invention, the alcohol-based coupling layer is interposed between the carbon-based protection layer and the lubrication layer so that the lubrication layer formed on the alcohol-based coupling layer has a good coverage. The alcohol-based coupling layer also has a function as an undercoat layer for the lubrication layer.

The lubrication layer preferably has a bonded ratio not smaller than 70%, more preferably, not smaller than 75%. If the bonded ratio of the lubrication layer is not smaller than 70%, it is possible to effectively prevent occurrence of a fly stiction defect in the LUL system. In this invention, the alcohol-based coupling layer is interposed between the carbon-based protection layer and the lubrication layer upon deposition so that the bonded ratio of the lubrication layer within the above-mentioned preferable range is obtained. In case where the alcohol-based coupling layer is deposited so that the film surface of the alcohol-based coupling layer after deposition has a water contact angle of 50 degrees or less, the bonded ratio of the lubrication layer within the more preferable range is obtained. Herein, the bonded ratio of the lubrication layer is given by a ratio of the thickness of the lubrication layer before dipping the magnetic disk into a predetermined solvent and the thickness of the lubrication layer after dipping, as will later be described in detail in conjunction with specific examples.

In the foregoing, description has been made of the case where the alcohol-based coupling layer and the lubrication layer containing the hydroxyl- or the carboxyl-modified compound are separately prepared and deposited. Alternatively, the functions of this invention can also be obtained by depositing a layer containing a mixture of alcohol and the hydroxyl- or the carboxyl-modified compound on the carbon-based protection layer. In this case, a preparation method such as a mixing method may be any appropriate method. In order to obtain a uniform dispersion, an appropriate solvent may be used. A mixing ratio between the alcohol and the hydroxyl- or the carboxyl-modified compound suitably falls within a range between 1/99 to 30/70 in weight ratio (alcohol/modified compound). If the content of the alcohol is smaller, the function of improving the adherence of the lubrication layer is difficult to obtain. If the content of the modified compound is smaller, an excellent lubricating characteristic is not obtained. As a deposition method, dipping or spin coating is appropriate. The thickness must be approximately equal to the total thickness of the alcohol-based coupling layer and the lubrication layer containing the modified compound in case where these layers are successively deposited.

In this invention, the disk is preferably heated after the alcohol-based coupling layer and the lubrication layer containing the hydroxyl- or the carboxyl-modified compound are successively deposited. In this invention, by interposing the alcohol-based coupling layer between the carbon-based protection layer and the lubrication layer upon deposition, the adherence between the protection layer and the lubrication layer is improved. By the above-mentioned heat treatment, the function of this invention is promoted and the adherence is further improved. The heat treatment is preferably carried out at a temperature between 80° C. and 150° C., more preferably between 80° C. and 110° C. in order to promote the function of this invention. The heat treatment may be carried out at a fixed temperature within the above-mentioned temperature range or while the temperature is changed continuously or stepwise within the above-mentioned temperature range. A heat treatment time is suitably 5 to 60 minutes if the heat treatment is carried out within the above-mentioned temperature range.

In this invention, the carbon-based protection layer is a hydrogen-containing diamond-like carbon (hydrogenated diamond-like carbon) protection layer. By containing hydrogen, the protection layer is improved in compactness (denseness) and hardness. If the content of hydrogen with respect to carbon in the protection layer is excessively large, a polymer-like carbon component is increased. In this event, an adhesion characteristic of the protection layer with respect to the magnetic layer may be degraded and the protection layer may be peeled off when a LUL operation is started. Therefore, an excessively large content of hydrogen is not preferable.

By containing nitrogen in the carbon-based protection layer, the adherence with the lubrication layer is further improved. Presumably, this is because, if nitrogen is contained in the carbon-based protection layer, triple bond between C (carbon) and N (nitrogen) is formed so that $N^+$ appears on the surface of the protection layer. It is supposed that, since $N^+$ has high affinity with a terminal group (hydroxyl group) of an alcohol material forming the alcohol-based coupling layer, the adherence between the lubrication layer and the protection layer is further improved through the alcohol-based coupling layer.

The carbon-based protection layer preferably has a thickness of 0.5 nm or more. If the thickness is smaller than 0.5 nm, the coverage of the protection layer may be decreased so that an excellent protection characteristic is not obtained. The thickness of the protection layer need not have a specific upper limit. Practically, however, the thickness of the protection layer is not greater than 6 nm so as not to inhibit the improvement in magnetic spacing.

In this invention, even if the protection layer is as very thin as 5 nm or less, the corrosion defect or the fly stiction defect of the magnetic head can be prevented. Therefore, it is possible to improve the magnetic spacing.

In this invention, an element forming the magnetic layer is not specifically limited. However, a cobalt (Co) alloy magnetic layer is preferable. The Co alloy magnetic layer has a high coercive force and a corrosion resistance and is therefore suitable for an increase in recording density.

As a Co alloy suitable in this invention, use may be made of a CoPt alloy, a CoCr alloy, and a CoCrPt alloy. Among others, a magnetic layer of the CoCrPt alloy is particularly suitable for an increase in recording density because magnetic grains can be reduced in size and a magnetic anisotropy constant of the grains can be improved.

In this invention, a glass substrate is preferably used as the substrate. This is because the glass substrate has a high flatness and smoothness and a high rigidity so as to meet the demand for a lower flying height of a magnetic head following an increase in recording density. As a material of the glass substrate, use may be made of, for example, an aluminosilicate glass, a soda lime glass, a soda aluminosilicate glass, an aluminoborosilicate glass, a borosilicate glass, a silica glass, a chain silicate glass, and a glass ceramic such as a crystallized glass. Among others, the aluminosilicate glass is particularly preferable because it is excellent in shock resistance and vibration resistance.

By chemically strengthening the aluminosilicate glass, a compressive stress layer can be formed on the surface of the glass substrate. In this event, the transverse strength, the rigidity, the shock resistance, the vibration resistance, and the heat resistance are excellent and, even under a high-temperature environment, precipitation of Na is avoided. In addition, the flatness is maintained and the Knoop hardness is excellent.

The glass substrate preferably has a thickness on the order between 0.1 mm and 1.5 mm.

By successively forming at least the magnetic layer, the carbon-based protection layer, the alcohol-based coupling layer, and the lubrication layer containing the hydroxyl- or the carboxyl-modified compound on the substrate, the magnetic disk of this invention is obtained. As a specific embodiment, the magnetic disk preferably comprises a seed layer, an underlayer, the magnetic layer, the carbon-based protection layer, the alcohol-based coupling layer, and the lubrication layer successively formed on the substrate.

For example, the seed layer may be formed by the use of an alloy having a bcc crystal structure or a B2 crystal structure, such as an Al alloy, a Cr alloy, an NiAl alloy, an NiAlB alloy, an AlRu alloy, an AlRuB alloy, an AlCo alloy, and an FeAl alloy, so that the magnetic grains can be reduced in size. Among others, the AlRu alloy, particularly, the alloy consisting of 30-70 at % Al and the balance Ru is preferable because the function of reducing the size of the magnetic grains is excellent.

As the underlayer, a layer which serves to adjust the orientation of the magnetic layer may be formed by the use of a Cr alloy, a CrMo alloy, a CrV alloy, a CrW alloy, a CrTi alloy, or a Ti alloy. Among others, the CrW alloy, particularly, the alloy consisting of 5-40 at % W and the balance Cr is preferable because the function of adjusting the orientation of the magnetic grains is excellent.

The details of other layers including the magnetic layer, the carbon-based protection layer, the alcohol-based coupling layer, and the lubrication layer have already been described.

The methods of forming the alcohol-based coupling layer and the lubrication layer have already been described. In order to deposit each of the remaining layers, a known technique may be used. For example, use may be made of sputtering (DC magnetron sputtering, RF sputtering, and so on) and plasma CVD.

In this invention, the surface of the magnetic disk preferably has a surface roughness of 6 nm or less in Rmax. If the surface roughness exceeds 6 nm, a decrease in magnetic spacing may be disadvantageously inhibited. The surface roughness herein referred to is defined in Japanese Industrial Standard (JIS) B0601 as a maximum height representative of a difference between a highest point and a lowest point of the surface and described in U.S. Pat. No. 6,544,893 B2.

The magnetic disk in this invention is excellent in LUL durability and is suitable as a magnetic disk to be loaded in a magnetic disk apparatus of a LUL system.

BRIEF DESCRIPTION OF THE DRAWING

A sole FIGURE is a schematic sectional view of a magnetic disk according to an embodiment of this invention.

DESCRIPTION OF THE PREFERRED EMBODIMENTS

Now, description will be made of embodiments of this invention in detail in conjunction with several specific examples. It is noted here that this invention is not limited to the following examples.

EXAMPLE 1

Referring to the sole FIGURE, a magnetic disk 10 in Example 1 comprises a glass substrate 1 with a nonmagnetic metal layer 2 composed of a seed layer 2a and an underlayer 2b, a magnetic layer 3, a carbon-based protection layer 4, an alcohol-based coupling layer 5, and a lubrication layer 6 successively laminated on the glass substrate 1. Each of these layers except the magnetic layer 3 is a nonmagnetic layer. FIG. 1 shows a state immediately after deposition. A boundary between he alcohol-based coupling layer 5 and the lubrication layer 6 may become unclear with lapse of time because of mutual diffusion.

Next, description will be made of a method of producing the magnetic disk 10 in Example 1.

At first, a molten glass was subjected to direct pressing by the use of an upper die, a lower die, and a body die to obtain a disk-shaped glass plate made of an aluminosilicate glass and having a diameter of 66 mmϕ and a thickness of 1.5 mm. The glass plate was subjected to grinding, precision polishing, end-face polishing, precision cleaning, and chemical strengthening. As a consequence, the glass substrate 1 for a magnetic disk was produced.

By the use of an atomic force microscope (AFM), the surface roughness of the glass substrate 1 obtained through the above-mentioned process was measured. As a result, it was confirmed that the glass substrate 1 had a flat and smooth surface having Rmax of 4.37 nm and Ra of 0.38 nm. The glass substrate 1 thus obtained was a substrate for a 2.5-inch magnetic disk and had an outer diameter of 65 mm, an inner diameter of 20 mm, and a thickness of 0.635 mm. Herein, the surface roughness Ra is also defined in Japanese Industrial Standard (JIS) B0601 as an arithmetic average roughness or a center-line-mean roughness and described in U.S. Pat. No. 6,544,893B2.

Next, by the use of a fixed-target deposition apparatus, the seed layer 2a, the underlayer 2b, and the magnetic layer 3 were successively formed on the glass substrate 1.

At first, by the use of an AlRu (Al: 50 at %, Ru: 50 at %) alloy as a sputtering target, the seed layer 2a of the AlRu alloy having a thickness of 30 nm was deposited on the glass substrate 1. Then, by the use of a CrMo (Cr: 80 at %, Mo: 20 at %) alloy as a sputtering target, the underlayer 2b of the CrMo alloy having a thickness of 20 nm was deposited on the seed layer 2a. Next, by the use of a CoCrPtB (Cr: 20 at %, Pt: 12 at %, B: 5 at %, the balance Co) alloy as a sputtering target, the magnetic layer 3 of the CoCrPtB alloy having a thickness of 15 nm was deposited on the underlayer 2b.

Next, on the magnetic layer 3, the carbon-based protection layer 4 was formed by plasma CVD. Specifically, in a mixed gas atmosphere comprising acetylene as a reactive gas and a nitrogen gas added thereto so that the content of the nitrogen gas is 3%, deposition was carried out so as to form the protection layer 4 made of nitrogenated diamond-like amorphous carbon and having a thickness of 3.0 nm. During deposition, a high-frequency power having a frequency of 27 MHz was applied to an electrode to produce plasma.

Deposition by plasma CVD may be carried out as IBD (ion Beam Deposition) by applying an electric voltage to the plasma.

Then, the disk with the underlayer 2, the magnetic layer 3, and the carbon-based protection layer 4 formed thereon was dipped and cleaned in pure water kept at 70° C. for 400 seconds and thereafter dipped and cleaned in isopropyl alcohol kept at 25° C. for 400 seconds.

Next, the alcohol-based coupling layer 5 of isopropyl alcohol (hereinafter abbreviated to IPA) was deposited on the carbon-based protection layer 4 by the use of the vapor deposition after the above-mentioned cleaning. The deposition time was 20 seconds. The thickness of the alcohol-based coupling layer 5 thus deposited was measured as follows.

The thickness of the alcohol-based coupling layer 5 was calculated from a peak intensity of OH stretching vibration measured by a FTIR (Fourier Transform InfraRed spectrometer). Specifically, a group of samples of IPA layers of several thickness levels were preliminarily prepared. The thickness of the sample group was measured by an optical method (ellipsometer). The peak intensity of OH stretching vibration at 3600-3650 $cm^{-1}$ was measured by the FTIR. The relationship between the thickness of the sample group and the peak intensity was obtained. Then, the peak intensity of OH stretching vibration of the alcohol-based coupling layer of the disk in Example 1 was measured by the FTIR. Based on the above-mentioned relationship, the thickness of the alcohol-based coupling layer was calculated. By the method using the FTIR, it is possible to precisely obtain the thickness of the alcohol-based coupling layer. As a result, the thickness of the alcohol-based coupling layer made of IPA in Example 1 was equal to 0.8 angstrom (Å).

The water contact angle of the surface of the alcohol-based coupling layer after deposition was observed and measured by an optical microscope. Specifically, pure water was filled in a syringe. By the use of the syringe, 0.5 μl of pure water was dropped onto the surface of the alcohol-based coupling layer and the contact angle was measured. The measurement of the contact angle was carried out in an environment in a clean room (class 1000) kept at a temperature of 25° C. In Example 1, the contact angle of IPA after deposition was equal to 35 degrees.

Next, on the alcohol-based coupling layer 5, the lubrication layer 6 of a PFPE (perfluoropolyether) compound was formed by dipping. Specifically, use was made of alcohol-modified perfluoropolyether having hydroxyl groups as functional groups at opposite terminal ends of a main chain. As a solvent, use was made of Vertrel™ XF (trade name) manufactured by DuPont Mitsui Fluorochemicals.

After the lubrication layer 6 was formed, the disk was heat treated in an oven at 110° C. for 60 minutes. The thickness of the lubrication layer 6 thus formed was measured by the method based on the peak intensity of OH stretching vibration using the FTIR and was equal to 13 Å.

As described above, the magnetic disk 10 in Example 1 was produced.

By the use of the atomic force microscope (AFM), the surface roughness of the magnetic disk 10 thus obtained was measured. As a result, it has been confirmed that the magnetic disk had a flat and smooth surface having Rmax of 4.40 nm and Ra of 0.39 nm.

Furthermore, the glide height of the magnetic disk 10 was measured and was equal to 4.5 nm. In order that the flying height of a magnetic head is stably kept at 10 nm or less, the glide height of the magnetic disk is desirably equal to 5 nm or less.

The magnetic disk 10 thus obtained was further subjected to various performance tests as follows.

Lubrication Layer Coverage Measurement

The coverage of the lubrication layer was calculated based upon a method of measuring an average thickness of the lubrication layer using X-ray photoelectron spectrometry. For example, the method is described in Japanese Patent Application Publication (JP-A) No. H7-192255. In Example 1, the coverage of the lubrication layer of the magnetic disk was equal to 93%.

Lubrication Layer Adherence Test

The thickness of the lubrication layer of the magnetic disk thus obtained was evaluated by the FTIR (Fourier Transform InfraRed spectrometer). Next, the magnetic disk was dipped in a fluorine-based solvent (Vertrel™ XF mentioned above) for one minute. By dipping the magnetic disk in the fluorine-based solvent, a part of the lubrication layer which has a weak adhesive force was dissolved in the solvent. On the other hand, a remaining part which has a strong adhesive force can be left on the protection layer. Next, the magnetic disk was drawn up from the solvent at a rate of 6 cm/minute. Again, the thickness of the lubrication layer was measured. The ratio of the thickness of the lubrication layer after dipping into the solvent with respect to the thickness of the lubrication layer before dipping into the solvent is called a lubrication layer bonded ratio. A high bonded ratio represents high adherence of the lubrication layer with respect to the protection layer. Specifically, the bonded ratio is preferably equal to 70% or more, especially, 75% or more. The magnetic disk in Example 1 had a bonded ratio of 85%.

LUL Durability Test

The LUL durability test was carried out in the following manner. The above-mentioned magnetic disk and a magnetic head having a giant magnetoresistive read element (GMR element) were mounted to a magnetic recording apparatus. The rotation speed of the magnetic disk was 5400 rpm. As a slider of the magnetic head, a NPAB (Negative Pressure Air Bearing) slider was used. The flying height of the magnetic head while flying was 10 nm. Under a high-temperature high-humidity environment of 70° C. and 80% RH (Relative Humidity) within the magnetic recording apparatus, load and unload (LUL) operations of the magnetic head were consecutively and repeatedly carried out. By measuring the number of times of the LUL operations without any failure caused in the magnetic recording apparatus, the LUL durability was evaluated.

In the magnetic disk in Example 1, the number of times of the LUL operations exceeded 1,000,000 without any failure. Generally, in the LUL durability test, it is required that the number of times of the LUL operations exceeds consecutive 600,000 times without any failure. In a normal working environment of an HDD, the use for about 15 years is required until the number of times of LUL operations exceeds 600,000. Thus, it is understood that the magnetic disk in Example 1 assures high reliability far superior than a qualifying standard.

Fly Stiction Test 100 magnetic disks in Example 1 were produced and subjected to a glide test by the use of a glide head having a flying height of 6 nm. Thus, occurrence of a fly stiction defect was examined. As described above, the magnetic disk in Example 1 had a glide height of 4.5 nm. Therefore, by testing the disks in the above-mentioned manner, the fly stiction defect can be examined. Specifically, if the fly stiction defect occurs, a flying position of the glide head suddenly becomes unstable. Therefore, by monitoring a signal of a piezoelectric element bonded to the glide head, it is possible to detect the occurrence of the fly stiction defect. Further, when the fly stiction defect occurs, a pass ratio of the glide test is significantly decreased. Therefore, the tendency of occurrence of the fly stiction defect is judged by the pass rate of the glide test. The pass rate (yield) of the fly stiction test is desirably as high as possible and is required to be not lower than 70%, preferably not lower than 90%.

For the magnetic disk in Example 1, the yield in the fly stiction test was as high as 98%.

The results of the above-mentioned various performance tests for the magnetic disk in Example 1 are collectively shown in Table 1.

EXAMPLE 2

A magnetic disk in Example 2 was produced in the manner similar to the magnetic disk in Example 1 except that the alcohol-based coupling layer had a thickness of 1.5 Å.

The magnetic disk obtained in Example 2 had a surface roughness and a glide height equivalent to those of the magnetic disk in Example 1.

The magnetic disk in Example 2 was subjected to various performance tests in the manner similar to Example 1. The results are shown in Table 1.

EXAMPLE 3

A magnetic disk in Example 3 was produced in the manner similar to the magnetic disk in Example 1 except that the alcohol-based coupling layer had a thickness of 2.0 Å.

The magnetic disk obtained in Example 3 had a surface roughness and a glide height equivalent to those of the magnetic disk in Example 1.

The magnetic disk in Example 3 was subjected to various performance tests in the manner similar to Example 1. The results are shown in Table 1.

EXAMPLE 4

A magnetic disk in Example 4 was produced in the manner similar to the magnetic disk in Example 1 except that the lubrication layer had a thickness of 10 Å.

The magnetic disk obtained in Example 4 had a surface roughness and a glide height equivalent to those of the magnetic disk in Example 1.

The magnetic disk in Example 4 was subjected to various performance tests in the manner similar to Example 1. The results are shown in Table 1.

COMPARATIVE EXAMPLE 1

A magnetic disk in Comparative Example 1 was produced in the manner similar to the magnetic disk in Example 1 except that the alcohol-based coupling layer was not deposited and the lubrication layer was directly formed on the protection layer.

The magnetic disk obtained in Comparative Example 1 had a surface roughness and a glide height equivalent to those of the magnetic disk in Example 1.

The magnetic disk in Comparative Example 1 was subjected to various performance tests in the manner similar to Example 1. The results are shown in Table 1. In Comparative Example 1, the alcohol-based coupling layer was not formed. Therefore, the "contact angle" in Table 1 represents the water contact angle of the surface of the protection layer after it was deposited.

EXAMPLE 5

A magnetic disk in Example 5 was produced in the manner similar to the magnetic disk in Example 1 except that a layer comprising a mixture of alcohol and a lubricating material was formed on the protection layer.

Specifically, 2% (in weight ratio) IPA was added to a lubricant coating solution having a composition same as that of the lubrication layer in Example 1. The lubrication layer was deposited on the protection layer by dipping to the thickness of 13 Å.

The magnetic disk obtained in Example 5 had a surface roughness and a glide height equivalent to those of the magnetic disk in Example 1.

The magnetic disk in Example 5 was subjected to various performance tests in the manner similar to Example 1. The results are shown in Table 1.

TABLE 1

|  | thickness (Å) | | contact angle (degree) | coverage (%) | bonded ratio (%) | yield in fly stiction Test (%) | LUL durability test (number of times) |
| --- | --- | --- | --- | --- | --- | --- | --- |
|  | alcohol layer | lubrication layer |  |  |  |  |  |
| Example 1 | 0.8 | 13 | 35 | 93 | 85 | 98 | 1,000,000 times or more |
| Example 2 | 1.5 | 13 | 33 | 92 | 80 | 95 | 1,000,000 times or more |
| Example 3 | 2.0 | 13 | 31 | 90 | 75 | 93 | 1,000,000 times or more |
| Example 4 | 0.8 | 10 | 35 | 91 | 87 | 95 | 1,000,000 times or more |
| Example 5 |  | 13 | — | 90 | 75 | 92 | 1,000,000 times or more |
| Comparative Example 1 | not formed | 13 | 51 | 84 | 68 | 68 | failed at 600,000 times |

With reference to the results in Table 1, the following observation is made.

In each of Examples according to this invention, the alcohol-based coupling layer was deposited between the protection layer and the lubrication layer so that the adherence of the lubrication layer is improved. The yield in the fly stiction test is as high as 90% or more. Even if the flying height is as very low as 10 nm in the LUL system, it is possible to effectively prevent occurrence of the fly stiction defect. Further, the LUL durability is very excellent so that the magnetic disk is suitable for the LUL system. Not only in case where the alcohol-based coupling layer is formed on the protection layer and then the lubrication layer is formed on the coupling layer but also in case where the layer comprising a mixture of alcohol and the lubricating material is formed on the protection layer as in Example 5, the effect of this invention is similarly obtained. On the other hand, in Comparative Example 1 in which the alcohol-based coupling layer is not formed but the lubrication layer is directly formed on the protection layer as known in the art, the adherence with the protection layer is poor and the bonded ratio is low. It is therefore impossible to sufficiently prevent occurrence of the fly stiction defect resulting from migration of contamination to the magnetic head. Further, the LUL durability is insufficient. Thus, the magnetic disk in Comparative Example 1 does not reach a practical level.

In this invention, the carbon-based protection layer 4 is preferably deposited by plasma CVD as in the above-mentioned Examples. The carbon-based protection layer deposited by the plasma CVD is compact and dense and is therefore excellent in LUL (load unload) durability. Even if the protection layer is a thin protection layer having a thickness as small as 6 nm or less, excellent durability is exhibited. Further, the carbon-based protection layer deposited by the plasma CVD is excellent in bondability with respect to the alcohol-based coupling layer and the layer containing lower alcohol.

In case where the carbon-based protection layer 4 is deposited by the plasma CVD, it is particularly preferable to form the carbon-based protection layer containing nitrogen. In this case, the bondability is excellent with respect to the alcohol-based coupling layer and the layer containing lower alcohol.

In case where the carbon-based protection layer 4 is deposited by the plasma CVD, a material gas is preferably a lower hydrocarbon gas. In particular, a lower unsaturated hydrocarbon gas is preferably used. As the material gas, an acetylene gas or an ethylene gas may be used by way of example.

As thus far been described in detail, with the magnetic disk according to this invention, it is possible to prevent occurrence of the fly stiction defect even if the flying height of the magnetic disk is low in the LUL system. Therefore, the magnetic disk is suitable for a lower flying height of the magnetic head so that an increase in recording density can be achieved. Further, the magnetic disk in this invention is very excellent in LUL durability and is therefore suitable for a magnetic disk apparatus of the LUL system, enabling an increase in capacity of the magnetic disk apparatus.

While this invention has thus far been described in conjunction with the preferred embodiments thereof, it will be readily possible for those skilled in the art to put this invention into practice in various other manners without departing from the scope set forth in the appended claims.

What is claimed is:

1. A magnetic disk adapted to be loaded in a magnetic disk apparatus of a load unload system, comprising:
   a disk substrate;
   a magnetic layer formed over the disk substrate;
   a carbon-based protection layer formed on the magnetic layer;
   an alcohol-based coupling layer containing only alcohol and formed on a carbon-based protection layer, an alcohol-based coupling layer having a first hydroxyl group; and
   a lubrication layer formed on the an alcohol-based coupling layer, the lubrication layer containing a hydroxyl-modified perfluoropolyether compound having a second hydroxyl group at a terminal end;
   wherein hydrogen bond is formed between the second hydroxyl group of the lubrication layer and the first hydroxyl group of the alcohol-based coupling layer to produce coupling force by the hydrogen bond between the carbon-based protection layer and the lubrication layer,
   wherein a bonded ratio of the lubrication layer for the carbon-based protection layer is not smaller than 70% by interposing the alcohol-based coupling layer between the carbon-based protection layer and the lubrication layer.

2. A magnetic disk according to claim 1, wherein the alcohol-based coupling layer or the alcohol contains lower alcohol as a main component.

3. A magnetic disk according to claim 1, wherein the carbon-based protection layer contains hydrogen or nitrogen.

4. A magnetic disk according to claim 1, wherein the thickness of the alcohol-based coupling layer is determined upon deposition.

5. A magnetic disk according to claim 1, wherein the alcohol-based coupling layer has a thickness within a range between 0.5-2.0 angstroms and is formed by vapor deposition.

\* \* \* \* \*